United States Patent
Bains et al.

(10) Patent No.: US 10,720,262 B2
(45) Date of Patent: Jul. 21, 2020

(54) POLYMER ABSORPTION SENSOR HAVING LOW CROSS-SENSITIVITY

(71) Applicant: SYSCOR CONTROLS & AUTOMATION INC., Victoria (CA)

(72) Inventors: Amandeep Singh Bains, Victoria (CA); Dale John Shpak, North Saanich (CA)

(73) Assignee: SYSCOR CONTROLS & AUTOMATION INC., Victoria, BC (CA)

(*) Notice: Subject to any disclaimer, the term of this patent is extended or adjusted under 35 U.S.C. 154(b) by 0 days.

(21) Appl. No.: 15/947,058

(22) Filed: Apr. 6, 2018

(65) Prior Publication Data

US 2018/0294067 A1    Oct. 11, 2018

Related U.S. Application Data

(60) Provisional application No. 62/484,129, filed on Apr. 11, 2017.

(51) Int. Cl.
| | |
|---|---|
| *H01B 1/24* | (2006.01) |
| *C08J 5/04* | (2006.01) |
| *C08K 3/04* | (2006.01) |
| *C08L 83/04* | (2006.01) |
| *C08L 57/00* | (2006.01) |
| *C08L 25/06* | (2006.01) |

(52) U.S. Cl.
CPC .............. *H01B 1/24* (2013.01); *C08J 5/042* (2013.01); *C08K 3/04* (2013.01); *C08L 25/06* (2013.01); *C08L 57/00* (2013.01); *C08L 83/04* (2013.01); *C08L 2203/16* (2013.01)

(58) Field of Classification Search
None
See application file for complete search history.

(56) References Cited

U.S. PATENT DOCUMENTS

| | | | |
|---|---|---|---|
| 3,045,198 A | 7/1962 | Dolan et al. | |
| 4,224,595 A | 9/1980 | Dolan | |
| 6,042,788 A * | 3/2000 | De Wit | G01N 27/126 422/82.02 |
| 6,290,911 B1 * | 9/2001 | Lewis | B01J 19/0046 204/406 |
| 6,315,956 B1 * | 11/2001 | Foulger | G01N 27/126 252/511 |
| 6,433,694 B1 | 8/2002 | Dolan et al. | |
| 7,112,304 B2 | 9/2006 | Starling et al. | |
| 7,138,090 B2 | 11/2006 | Blok | |
| 2002/0141901 A1 * | 10/2002 | Lewis | G01N 15/0826 422/82.01 |
| 2006/0292033 A1 | 12/2006 | Blok et al. | |
| 2007/0117207 A1 | 5/2007 | West et al. | |
| 2008/0017507 A1 * | 1/2008 | Ramamurthy | G01N 27/126 204/400 |
| 2011/0286889 A1 | 11/2011 | Ramamurthy et al. | |

(Continued)

*Primary Examiner* — Katie L. Hammer
(74) *Attorney, Agent, or Firm* — Davis & Bujold PLLC; Michael J. Bujold (57) ABSTRACT

A polymer matrix film useful in the preparation of a polymer absorption sensor. The polymer matrix film includes at least one first polymeric material which is elastomeric in nature, at least one second polymeric material which is crystalline and/or glassy in nature, and at least one conductive material.

10 Claims, 6 Drawing Sheets

(56) References Cited

U.S. PATENT DOCUMENTS

2012/0270205 A1* 10/2012 Patel .................... G01N 27/126
                                                                         435/5
2016/0238547 A1* 8/2016 Park ........................ G01K 7/16
2016/0287175 A1* 10/2016 Coleman .................. C08K 3/01

* cited by examiner

POLYMER ABSORPTION SENSOR HAVING LOW CROSS-SENSITIVITY

FIELD OF THE INVENTION

The present invention relates generally to a device useful for the detection of vaporized and/or liquid chemical analytes and general environmental monitoring. More specifically, the device is applicable in the detection of one or more chemicals in an environment through rapid sorption by the chemical sensing elements of the device, whilst reducing cross-sensitivity to confounding environmental conditions such as temperature and water saturation.

BACKGROUND OF THE INVENTION

Detection of specific target analytes, or chemical compounds, is important for many applications, such as: detection of potentially harmful analytes in the environment, detection of analyte concentrations such that they do not exceed flammability limits, and early detection of chemical leaks. Target analytes may be liquids, vapours or gases, and are detected by sensors operating according to various detection mechanisms which are known in the art. A popular type of detection sensor is a sorption-based sensor (e.g., a polymer absorption sensor), wherein chemical sorption results in observable physical changes in the sensor. One example of such a sensor is a chemiresistor. A chemiresistor is a sensor where, upon sorption of specific chemicals, there is a physical change in the sensor, resulting in a corresponding change in sensor resistance (usually measured as the normalized change in resistance $dR/R_0$; where $dR$ is the change in resistance and $R_0$ is the chemiresistor base resistance). Hereinafter, the term polymer absorption sensor (or "PAS") will be used in the place of chemiresistor. In general, interest in these types of sensors stems from a number of factors such as their robustness, the fact that they are relatively cost-effective to manufacture, their ease of installation and minimal need for maintenance, whilst maintaining reliable output under a wide range of environmental conditions.

The sensitivity of a PAS to the concentration of a target analyte or to a confounding environmental condition (hereinafter "CEC") is defined as the change in $dR/R_0$ of the PAS in response to a corresponding change in the analyte concentration or in the magnitude of the CEC. To clarify the difference between the desired sensitivity to the target analyte from the undesired sensitivity to CECs, the term "sensitivity" is typically used when referring to the PAS response to the target analyte, whereas the term "cross-sensitivity" is typically used when referring to the PAS response to a CEC.

A CEC is an environmental condition which interferes with the accurate measurement of the concentration of the target analyte. In the context of PAS performance, the most important CECs are time-varying fluctuations in temperature and/or water saturation PASs which can reversibly, reproducibly, and selectively detect hydrocarbon-containing vapours and liquids are of great interest in applications pertaining to the petrochemical industry. Current applications of PASs for chemical detection in the petrochemical industry include: detection of the leakage of volatile organic compounds (VOCs) during transport (pipelines, pump stations), storage (tanks), and extraction. PASs for the detection of VOCs have been known in the art since the early 1960's. There are numerous existing patents for PASs having applications in industries which include the transport industry, the petrochemical industry, and health and safety industries. Examples of such patents include U.S. Pat. Nos. 3,045,198; 4,224,595; 6,433,694; 7,112,304; and 7,138,090; and US Patent Applications 2006/0292033; 2007/0117207; 2008/0017507; and, 2011/0286889. In general, the focus of these involves improvements in sensor detection and sensitivity. These improvements were mostly made with respect to sensor materials (e.g., changes in conducting particle material, morphology, and polymer formulations) and electrical hardware.

More recent patent applications (for example, US 2007/0117207 and 2011/0286889) have moved toward reducing PAS cross-sensitivity to CECs. Cross-sensitivity to CECs causes undesirable changes in the $dR/R_0$ of the PAS, thereby rendering it difficult or impossible to accurately interpret sensor measurements. Ideally, a PAS should be sensitive only to changes in the concentration of the target analyte, and should have zero cross-sensitivity to CECs.

Existing examples of chemical absorption sensors generally available to the petrochemical industry have one critical downfall: they exhibit a significant and highly-undesirable cross-sensitivity to CECs. This downfall is a result of the sensing mechanism utilized by these absorption sensors. PASs are chemiresistors, i.e., the electrical resistance of the sensor changes in response to changes in the immediate chemical environment. A typical PAS, as known in the art, is composed of an elastomeric polymer film (e.g., a polymer matrix composed of polydimethylsiloxane) which is affixed to a nonconductive substrate, such as a glass-epoxy circuit board. An electrical potential is applied across the polymer matrix to facilitate the measurement of PAS resistance. The polymer matrix will swell (expand), or increase in volume, while in the presence thermodynamically-compatible analytes, thereby inducing a detectable change in the electrical resistance of the polymer matrix. Changes in matrix volume can also occur in response to CECs, such as fluctuating temperature or water saturation. Temperature fluctuations will result in the polymer matrix expanding (increasing volume) or contracting (decreasing volume) with increasing and decreasing temperature, respectively, thus changing the sensor's resistance. Similarly, sensor water saturation will increase sensor volume through sorption of water, resulting in resistance changes in the sensor. Sensor cross-sensitivity to CECs is undesirable as this cross-sensitivity leads to false detections and inaccurate data, undermining the intended application of the device.

A typical example of a chemical sensor known in the art employs conductive particles which are distributed throughout the polymer matrix, wherein these particles serve to enhance changes in the resistance of the matrix when the volume of the polymer changes, thereby improving the sensitivity of the sensor. However, these types of sensors also exhibit an undesirable cross-sensitivity to CECs. In essence, any sensor film or matrix which relies upon physical changes resulting from absorption of a chemical analyte is generally also sensitive to volumetric and resistive changes which are dependent on temperature, water, or other environmental factors. A potential drawback of sensor cross-sensitivity to CECs is the likelihood of producing false positives and/or providing inaccurate data. Thus it is desirable, from an applications perspective, to improve sensitivity to target chemical analytes whilst minimizing cross-sensitivity to CECs, such as temperature and water saturation.

The present invention greatly improves upon the previous technologies in the art by incorporating at least one glassy and/or crystalline polymer within the polymer matrix. Such a glassy and/or crystalline polymer modifies the structure of the matrix, thereby yielding a sensor which mitigates cross-sensitivity to CECs.

SUMMARY OF THE INVENTION

In one aspect, the present invention provides a new polymer matrix film which is useful in the manufacture of PAS devices.

In another aspect, the present invention provides a PAS device having a reduced cross-sensitivity to confounding environmental conditions such as temperature and water saturation. Methods of preparing such devices are also provided.

A PAS of the invention comprises a polymer matrix film which comprises a first polymeric material which is elastomeric in nature, a second polymeric material which is crystalline and/or glassy in nature and further comprises at least one conductive material which may be conductive particles, conductive polymers, or combinations thereof.

In one embodiment, the sensor is constructed using a substrate which has an electrically non-conductive, non-absorbent, relatively resilient surface. An example of the first polymeric material is, but is not limited to, a siloxane polymer having the formula —$R_2SiO$—$_n$, such as poly (dimethylsiloxane). Examples of the crystalline and/or glassy polymer include, but are not limited to, polyethylene, polypropylene, polyurethane, polystyrene, and poly(methyl methacrylate).

Those skilled in the art will appreciate that any of the aforementioned polymeric materials may be comprised of mixtures of different polymers.

The conductive materials useful in the preparation of a polymer matrix film of the invention may be comprised of conductive particles including, but not limited to, graphitized carbon and metallic nanoparticles, such as gold or silver nanoparticles, graphene, single- or multi-walled carbon nanotubes, and carbon nanofibers, or mixtures thereof.

Conductive materials may also be comprised of one or more conductive polymers such as, but not limited to, polythiophene, polypyrrole, and polyaniline, or mixtures thereof.

PAS devices of the current invention exhibit good sensitivity to target VOCs whilst significantly mitigating cross-sensitivity to CECs.

PAS devices of the current invention also exhibit enhanced sensor reversibility after analyte detection when compared to PAS devices known in the art.

DRAWINGS

The drawings described herein are representative in nature only and are not intended to limit the scope of the present invention in any way. The present invention will become more fully understood from the detailed description and the accompanying drawings, wherein.

DETAILED DESCRIPTION OF THE INVENTION

The following description is in no way intended to limit the disclosure, application, or uses of the invention described herein.

The present invention provides an electrical sensor element (specifically, a polymer absorption sensor) which, when compared to the existing art, provides improved sensor performance in that it exhibits significantly reduced cross-sensitivity when exposed to confounding environmental conditions (herein "CECs"). A CEC is an environmental condition which interferes with the accurate measurement of the concentration of the target analyte. In the context of polymer absorption sensor (hereinafter "PAS") performance, the most important CECs are time-varying fluctuations in temperature and/or water saturation.

A PAS of the invention also exhibits enhanced sensor reversibility after analyte detection when compared to PAS devices known in the art.

A PAS of the invention is intended to be used in an environment where exposure to various types of chemical analytes is expected. The purpose of this invention is to have high sensitivity to one or more target chemical analytes, such as volatile organic compounds (herein "VOC's"), for example gasoline, crude oil, or natural gas, and to not exhibit significant cross-sensitivity to CECs or to chemical analytes other than the targeted VOCs.

An exemplary application for the present invention is for the detection of VOCs. The PAS material composition and the VOC detection mechanism for such an embodiment were chosen to exhibit specific sensitivity to VOCs. This is not intended to limit the scope of the current invention. Specific analytes, or types of analytes, can be targeted by the appropriate selection of the various components of a PAS of the invention.

The sensitivity of a PAS to the concentration of a target analyte or to a CEC is defined as the change in $dR/R_0$ (where dR is the change in resistance and $R_0$ is PAS base resistance) of the PAS in response to a corresponding change in the analyte concentration or in the value of the CEC. To clarify the difference between the desired sensitivity to the target analyte from the undesired sensitivity to CECs, the term "sensitivity" is typically used when referring to the PAS response to the target analyte, whereas the term "cross-sensitivity" is typically used when referring to the PAS response to a CEC.

Without intending to limit the scope of the present invention it is thought that, in general, all sorbent polymer-based sensing devices operate according to the same basic principle: the sensor operates through sorption of a target analyte by the polymer matrix film, resulting in a detectable physical change in the sensor. Among existing VOC detection techniques known in the art, polymer matrix films (polymer film) are uniquely suited to small, low-power, low-cost, robust applications. In general, polymer matrix films are utilized in PASs and the term refers to a polymer system with filler particles and/or other polymers. Polymer matrix film materials are selected based upon their ability to reversibly form chemical bonds (e.g., van der Waals forces: hydrogen bonds and dipole-dipole interactions) with specific target chemical analytes. The extent of VOC sorption into a particular polymer depends upon the chemical properties of the polymer. For example, polar polymers will tend to absorb polar analytes, and nonpolar analytes tend to be absorbed by nonpolar polymers. The cross-sensitivity of polar polymers absorbing nonpolar analytes (and vice versa) is negligible. The selective sensitivity of polymer films to chemical analytes gives rise to two well-known desirable absorption sensor properties: 1) targeted chemical analyte detection; and, 2) identification of specific VOCs by way of comparing responses of the PAS elements in an array of PAS, where each PAS element comprises a polymer film with differing chemical properties.

Hansen solubility parameters (HSP) are used in a common method of modeling and predicting the strength of interactions between polymers and target chemical analytes. If an analyte and a polymer have solubility parameters (HSP) which are relatively equivalent, they will be relatively miscible and will likely absorb each other. HSP parameters for some relevant materials are listed in Table 1. In general, increased polymer and chemical analyte absorption result in a detectable change in a polymer film's chemical, physical (swelling), or electrical properties. For example, mercaptan (an additive in crude oil) has a HSP of 16.6 $MPa^{1/2}$, water has a HSP of ~48 $MPa^{1/2}$, and poly(dimethylsiloxane) (a common PAS material) has a HSP of ~15 $MPa^{1/2}$. Considering these solubility parameters, one can reasonably predict that mercaptan will likely invoke a strong response in a poly(dimethylsiloxane)-based sensor; whereas, water will not. Aside from PAS sensitivity to target chemical analytes, PAS formulations known in the art also have undesirable cross-sensitivities to CECs.

In general, there are various challenges associated with the development of a robust PAS which has high sensitivity to one or more chemical analytes, whilst exhibiting low cross-sensitivity to CECs. Typical polymer sensor films having application in VOC detection, as established in the art, are comprised of organic polymeric materials which have an undesirable, relatively high coefficient of thermal expansion (CTE) and which also absorb water to some degree. Polymer films with relatively high CTEs will expand and contract to a greater extent in response to fluctuations in ambient temperature. In general, as temperature is increased, polymer films will expand, and when temperature is decreased polymer films will contract. For chemiresistors (PASs), polymer matrix film expansion results in an increase in sensor resistance, whereas contraction results in a decrease in sensor resistance. Furthermore, with respect to water absorption, highly saturated conditions result in polymer swelling (thereby increasing PAS resistance) and vice versa for relatively low water saturation levels. Sensitivity to either temperature or water saturation is highly undesirable in a PAS, since it can confound the measured response to the target analyte. CTE parameters for some relevant materials are listed in Table 1.

Prior art has attempted to mitigate cross-sensitivity to CECs through changes in PAS hardware (for example US Patent Application No 2007/0117207) or changes in conducting materials (for example US Patent Application No 2008/0017507). In general, these advancements in the art are cumbersome to produce, expensive, and in the case of US Patent Application No 2008/0017507, requires relatively exotic new materials which are yet to be entirely understood. Exemplary embodiments of the present invention mitigate PAS cross-sensitivity to temperature and water through the integration of a second commonly available, well understood, crystalline and/or glassy low-molecular-weight polymer such as polystyrene.

| Material/Analyte | CTE (1/K) | Hansen Solubility Parameter/ $\delta$ ($MPa^{1/2}$) | Rationale |
|---|---|---|---|
| Poly(dimethylsiloxane) | $9.07 \times 10^{-4}$ | 15.1 | Low polarity; commonly available polymer; easy to manufacture and cross-link |
| Polystyrene | $8 \times 10^{-5}$ | 15.6 | Low polarity; glassy polymer; well-studied, ubiquitous material |
| Poly(methyl methacrylate) | $2\text{-}3 \times 10^{-4}$ | 18.0 | Low polarity; glassy polymer; well-studied, ubiquitous material |
| Polypropylene | $6.5 \times 10^{-5}$ | 18.8 | Low polarity; commonly available polymer |
| Polyethylene | $3 \times 10^{-4}$ | 16.8 | Low polarity; commonly available polymer |
| Isooctane | | 14.1 | VOC; Simulant to fuel (gasoline) |
| Toluene | | 18.2 | VOC; Simulant to fuel; common solvent |
| Acetone | | 19.9 | VOC; common solvent |
| Mercaptan | | 16.6 | Additive in Crude Oil |
| Water | | 47.8 | Common Interferent |

The present invention exhibits good PAS sensitivity to VOCs while mitigating cross-sensitivity to CECs.

The present invention also exhibits enhanced sensor reversibility after analyte detection.

A polymer matrix film of the present invention comprises a first polymeric material which is elastomeric in nature, a second polymeric material which is crystalline and/or glassy in nature and further comprises one or more conductive materials.

Suitable elastomeric polymers are well known in the art, and examples of such polymers useful for the manufacture of a polymer matrix film of the invention include, but are not limited to, siloxane (i.e., the chemical composition —($R_2SiO$)—$_n$); poly(dimethylsiloxane); siloxane comprising a monomer having an alkyl hydrocarbon side group containing two or more carbon atoms; siloxane having side groups consisting of alkyl, aryl, alkenes, or aromatics; and siloxane further comprising hydrocarbons which constitute polar functional groups.

Preferably the elastomeric polymer is cross-linked. More preferably, the elastomeric polymer has a favourable HSP, such that interaction between the polymer and target analyte results in a change in the polymer matrix's chemical, physical (swelling), or electrical properties.

Molecular weights of polymers useful in the preparation of a polymer matrix film of the invention depends upon the specific composition of the matrix. As an example, polystyrene having a number average molecular weight in the range of from about 5,000 to about 30,000 g/mol. may be used.

Suitable crystalline and/or glassy polymers include, but are not limited to, polyethylene, polypropylene, polyurethane, polystyrene (vinyl benzene), poly(methyl methacrylate), vinyl halides, polyesters, acrylics and mixtures thereof.

The crystalline and/or glassy polymer may have a favourable HSP, such that interaction between the polymer and target analyte results in a change in the polymer matrix's chemical, physical (swelling), or electrical properties.

The conductive materials useful for the manufacture of a polymer matrix film of the invention can be comprised of one or more metallic or carbon-based particles and mixtures thereof. Suitable metallic particles include, but are not limited to, nickel, gold, silver, manganese, copper, iron, cobalt, magnesium, platinum, and aluminum and any borides, nitrides, carbides, oxides, alloys, and any mixture thereof. Suitable carbon-based particles include, but are not limited to, graphitized carbon, carbon black, graphene, single- or multi-walled carbon nanotubes, and other carbon-based particles (whiskers, fibers, rods, filaments, tubes, spheres, nanofibers, nanospheres, caged structures, buckyballs), and any mixture thereof.

The conductive materials useful for the manufacture of a polymer matrix film of the invention can also be comprised of one or more conductive polymers such as, but not limited to, polythiophene, polypyrrole, and polyaniline, or mixtures thereof.

Mixtures of metallic particles, carbon-based particles and conductive polymers may also be employed.

The following descriptions and embodiments are representative of the present invention and are in no way intended to limit the scope of the present invention.

One embodiment of the present invention utilizes poly (dimethylsiloxane) (PDMS) as the first polymer, low-molecular-weight polystyrene ($M_N$<30 000 g/mol) as the second polymer and carbon black as the conductive material.

PDMS is a commonly used PAS polymer film material because of its relatively low electrical conductivity, robustness, elastomeric properties, and HSP which is similar to several target VOCs. Furthermore, PDMS is easily cross-linked, allowing for the facile manufacture of robust polymer films. In contrast to PDMS, polystyrene has a CTE which is an order of magnitude lower and similar HSP, as shown in Table 1. For these reasons, an exemplary embodiment of present invention has a blend of polystyrene and PDMS in its polymer matrix film.

Compared to the existing art, the present invention exhibits strong mitigation of sensor cross-sensitivity to CECs. PAS reversibility (returning to base resistance following a significant reduction in the concentration of the target analyte), is also significantly enhanced. The addition of low-molecular-weight polystyrene allows for the manufacture of relatively cheap, very robust, very stable (under CECs), and very responsive (with respect to VOC detection) polymer absorption sensor; marking a significant non-trivial improvement upon the prior art.

Figure 1:
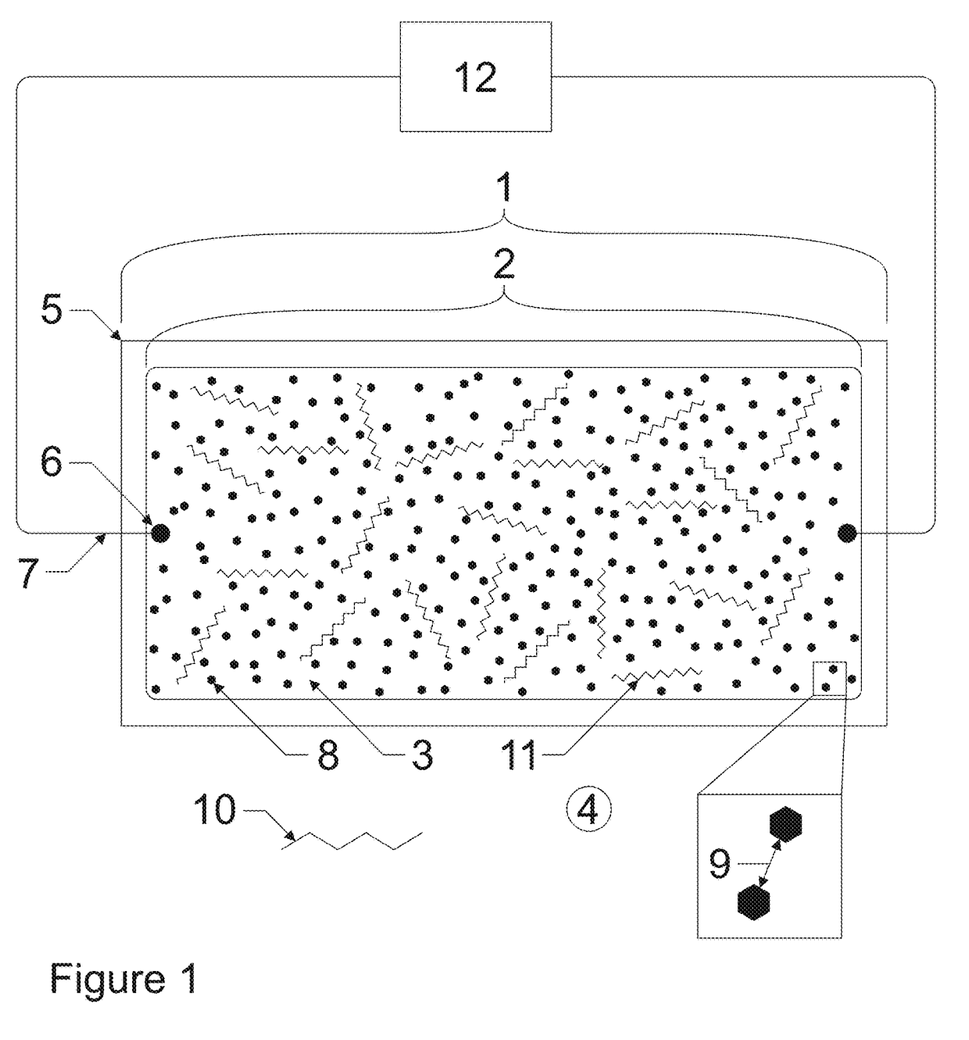
FIG. 1 is a detailed top-down view of the PAS polymer matrix film.
Figure 2:
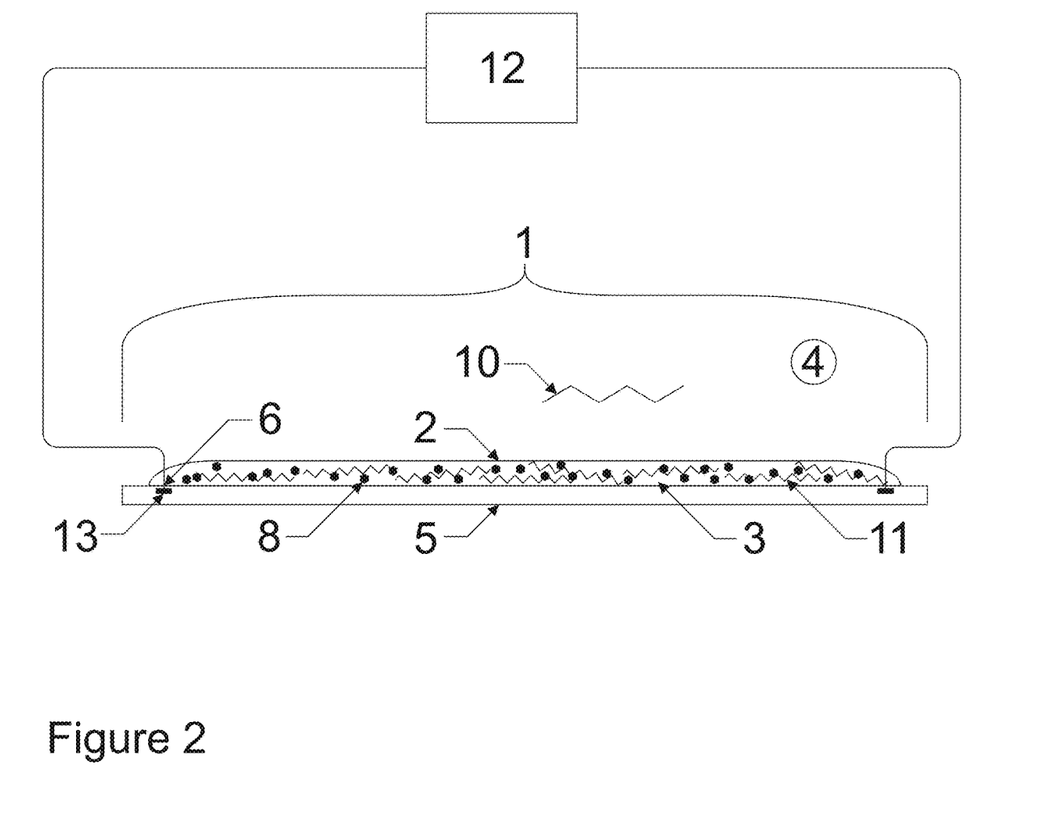
FIG. 2 is a detailed side-on view of the PAS polymer matrix film.

FIGS. 1 and 2 are representative illustrations of a PAS of the invention 1 including depictions of the polymer matrix film 2 which comprises a first polymer 3, a second polymer 11 and conducting particles 8 (e.g., carbon black). The polymer matrix film 2 is preferentially affixed to a mechanical substrate 5 (such as a glass-reinforced epoxy laminate printed circuit board) and is connected to electrical measurement circuitry 12 using two or more electrical wires 7 which are connected to electrical terminals 6 which provide an electrical connection to the polymer matrix film 2. In lieu of the wires 7, the PAS 1 may have electrodes 13 (ref. FIG. 2) optionally disposed beneath and attached to the sensor terminals 6. The electrodes 13 can be employed to facilitate connection to the measurement circuitry 12 by using existing electrical surface-mounting technologies or electrical socket connections. The terminals 6, wires 7 and electrodes 13 serve an equivalent purpose: to provide an electrical connection between the polymer matrix film 2 and the measurement circuitry 12. The electrodes 13 and terminals 6 are made of a conductive material (e.g., gold). The measurement circuitry 12 is well known in the art and is not a facet of the present invention.

The polymer matrix film 2 interacts with the external environment 4 to detect the presence of target VOCs 10. The polymer matrix film 2 operates in conjunction with the electrical instrumentation circuitry 12 to yield a measurable signal which indicates the presence or concentration of target VOCs 10 in the external environment 4. The intrinsic resistance (base resistance) of each sensor is a function of parameters which include the conductivity of the conducting particles 8, e.g., carbon black, and the inter-particle distance 9. Upon exposure to VOCs 10 the polymer matrix 2 expands as VOCs are absorbed. As a result of the expansion of the polymer matrix 2, the inter-particle distance between the conducting particles 9 increases, resulting in an increase in electrical resistance which can be detected by the electrical measurement circuitry 12. The distribution of low-molecular-weight polystyrene chains 11 within the polymer matrix 2 aids PAS 1 reversibility following VOC 10 exposure. The present invention thereby provides improved PAS 1 cross-sensitivity to CECs.

Figure 3:
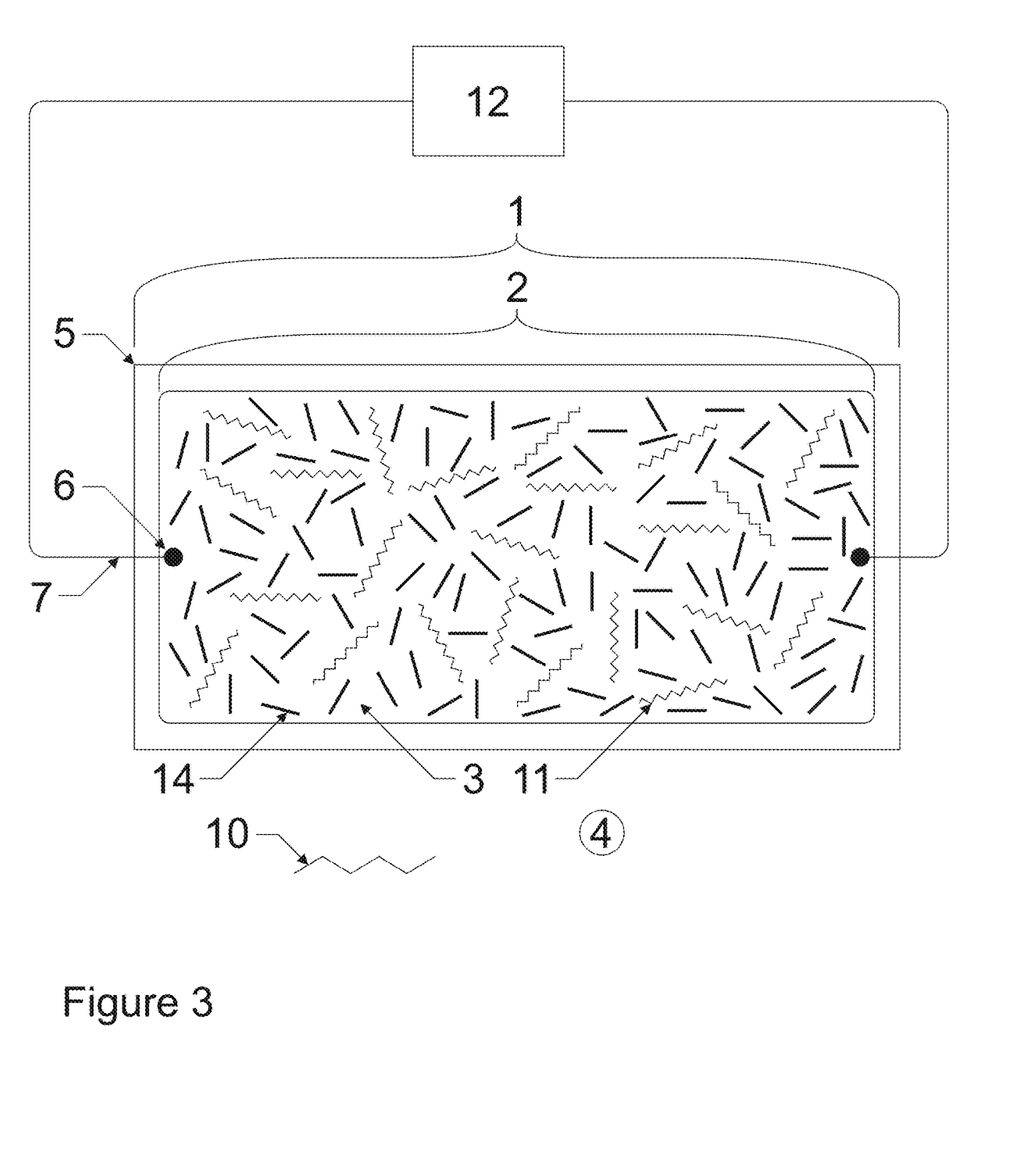
FIG. 3 is a detailed top-down view of a PAS polymer matrix film with graphene nanotubes.

In another embodiment of the invention, shown in FIG. 3, the conducting particles are comprised of graphene nanotubes 14. The PAS illustrated in FIG. 3 is similar to the PAS illustrated in FIGS. 1 and 2, differing mainly in the composition of the conducting particles. Changing the conducting particle composition in this manner can greatly enhance PAS 1 sensitivity to VOCs 10. This increase in PAS sensitivity due to graphene nanotubes has been well established in the prior art. However, as in the previous embodiment, the addition of low-molecular-weight polystyrene chains to both stabilize PAS base resistance, $R_0$, when exposed to CECs and to improve PAS reversibility, is a novel and greatly beneficial improvement over the existing art.

Figure 4:
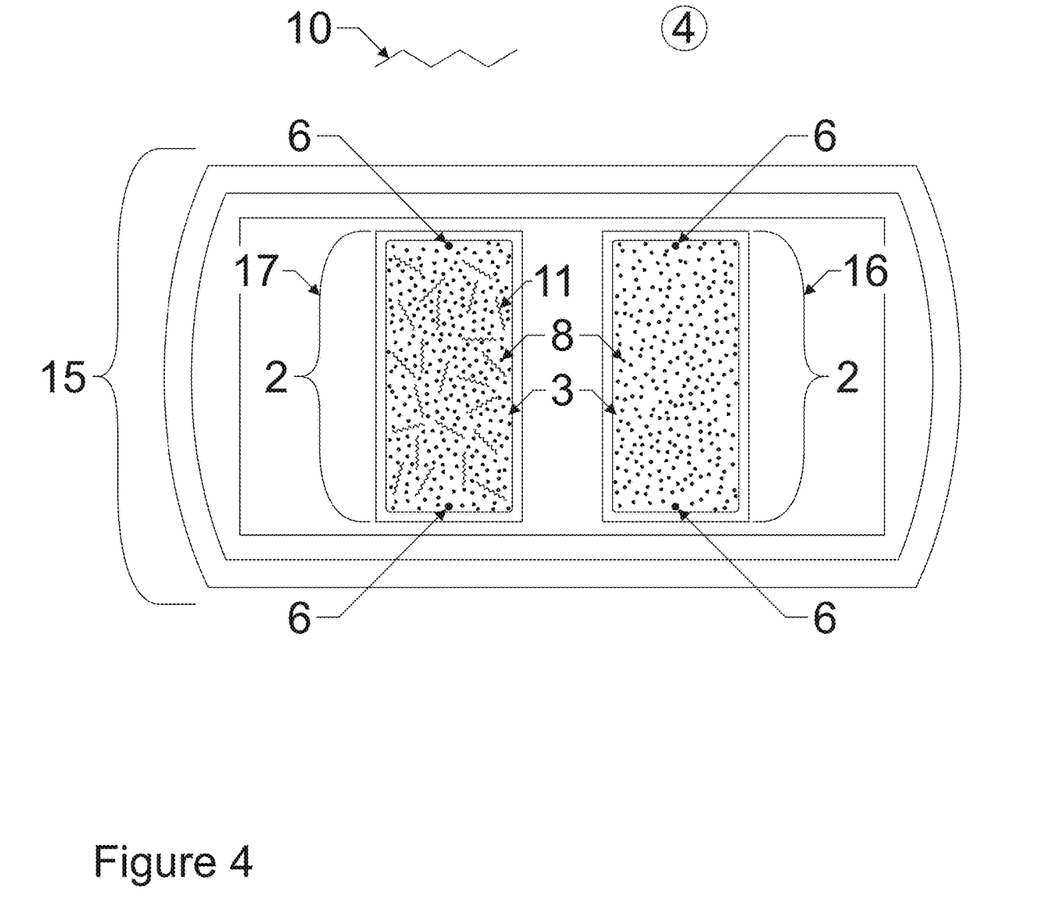
FIG. 4 is a detailed top-down view of an array of PAS polymer matrices for the evaluation of ambient environmental relative humidity.

In another embodiment of the present invention, shown in FIG. 4, a sensor device 15 consisting of an array of two or more PAS is constructed to detect both relative humidity and the presence of VOCs 10 in the ambient environment 4. The illustrative sensor device 15 is composed of two PAS (16 and 17), where one PAS 16 has a polymer matrix 2 comprised wholly of an elastomeric polymer 3, such as PDMS, and conductive particles 8, such as carbon black; and the other PAS 17 has a polymer matrix of the invention 2 comprised of a first polymer 3, a second polymer 11, and conductive particles 8. The device detects relative humidity by comparing the resistances of the two PAS in response to changes in the dynamic ambient environment. Essentially, this device 15 uses the known difference in cross-sensitivity to water absorption for the two PAS (16 and 17) to estimate the environmental humidity. For this device 15, the resistance of each of the two PAS must be measured separately but, for clarity in the Figure, the required electrical circuitry is not shown because it is well known in the art. Ambient temperature data can be used to further improve the accuracy of this sensor device 15. Additionally, the differing responses of the two or more PAS can be used to estimate both the VOC concentration and the ambient humidity.

Those skilled in the art will appreciate that other combinations of polymers and conductive materials may be employed to yield similar results.

EXAMPLE

A specific example of a PAS 1 described in FIG. 1 was produced by combining a first elastomeric polymer, polydimethylsiloxane (PDMS) 3, with a second polymer, polystyrene (PS) 11, and carbon black 8 into a suspension. The PDMS (Sylgard 184) was from Dow Corning and the polystyrene was synthesized in-house with a number average ($M_N$) molecular weight<30,000 g/mol. To aid in the mixing process, a good solvent for both polymers, in this case tetrahydrofuran, was added to the polymer mixture. The first elastomeric polymer and the second polymer were combined in a 5:1 ratio, respectively; furthermore, the resulting polymer mixture (PDMS and PS) was then combined with carbon black (Black Pearl 2000 from Cabot Corp.) in a 5:3 ratio, respectively. The resulting suspension was then coated onto a mechanical substrate (in this embodiment, a glass-reinforced epoxy laminate printed circuit board) 5 and cured for 12 hours at 100° C. After the curing processes, the sensor was attached to electrical measurement circuitry 12 through gold-plated terminals (16 mm² each) 6 using wires 7. This specific PAS formulation has been tested and yields enhanced mitigation of cross-sensitivity to temperature whilst accurately and reproducibly detecting hydrocarbons, as exhibited by the two experimental studies which are described in the following paragraphs.

Figure 5:
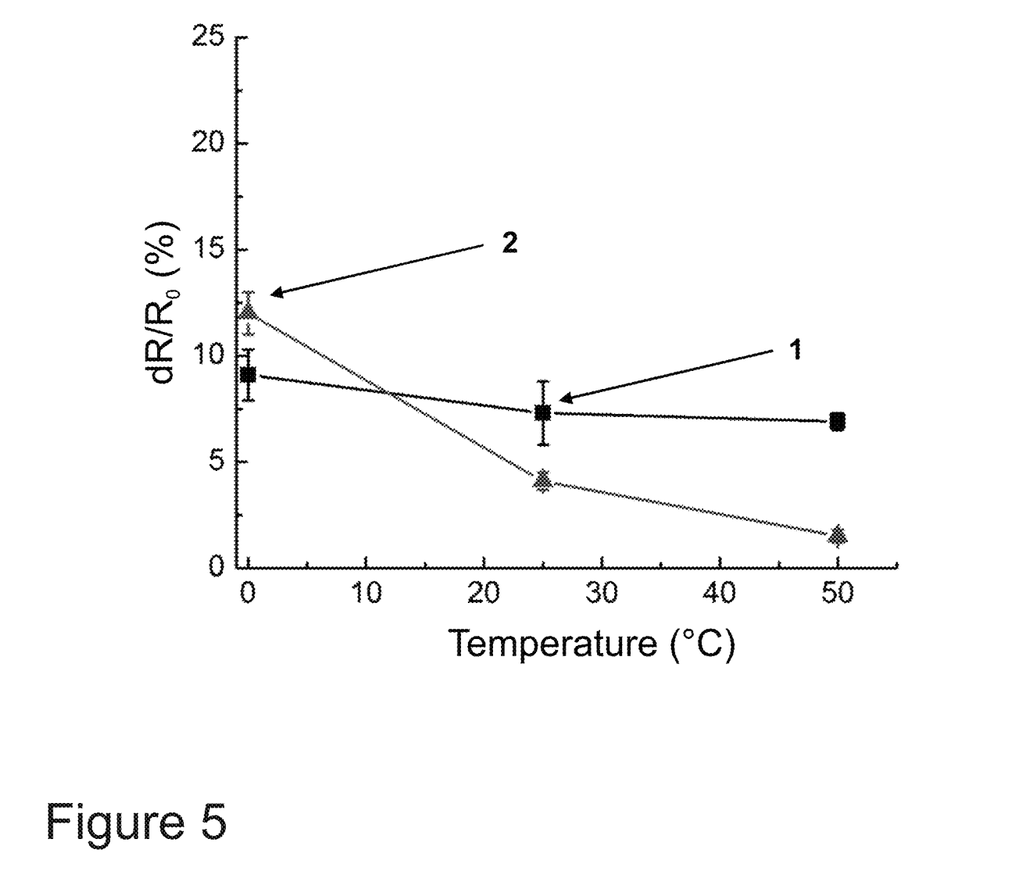
FIG. 5 shows PAS response to repeated hydrocarbon exposure at three temperatures.

In the first study (with reference to FIG. 5), the hydrocarbon hexane was detected at various temperatures by two PAS devices: the PDMS/PS-based embodiment of the present invention as described in the preceding paragraphs (hereinafter referred to as "PAS-A"); and, a pure PDMS-based sensor (hereinafter referred to as "PAS-B"), which is presented solely for comparative purposes. PAS formulations based purely on PDMS are well established in the art and PAS-B was fabricated in a manner similar to PAS-A, except for the inclusion of polystyrene. FIG. 5 presents data contrasting PAS response to hexane (i.e., the measured $dR/R_0$, shown as a percentage) using PAS-A (line labeled 1) and PAS-B (line labeled 2) at three temperatures. In this Figure, the abscissa is $dR/R_0$ (as a percentage), which is the change in the resistance of the sensor divided by its base resistance. Notably, the PAS-A did not exhibit significant variability in PAS hydrocarbon response as a function of temperature from 0° C. to 50° C. On the other hand, the pure PDMS-based PAS-B exhibited significantly decreasing PAS hydrocarbon response as a function of increasing temperature. From the measured data, the response of PAS-A decreased from 9% to 6.9% from 0° C. to 50° C., which is a factor of 1.3 (i.e., close to the ideal factor of 1.0), whereas the response of PAS-B decreased from 12% to 1.5%, which is a factor of 8. Therefore, the undesirable high cross-sensitivity to temperature exhibited by the pure PDMS-based PAS-B was not observed for the new PDMS/PS-based PAS-A.

Figure 6:
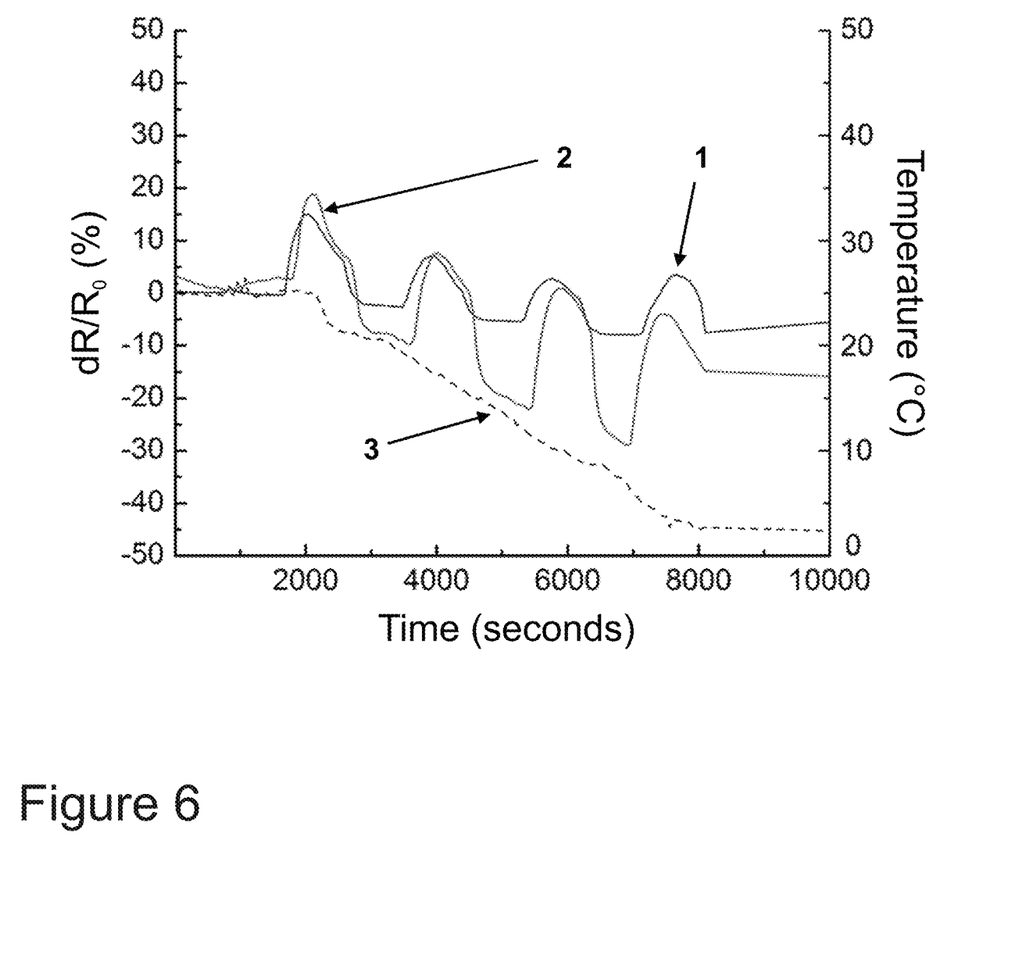
FIG. 6 shows PAS response to repeated hydrocarbon exposure and baseline drift with negative temperature ramping.

In the second study (with reference to FIG. 6), equivalent volume hydrocarbons were injected and detected (again using $dR/R_0$) by the same two PAS devices (PAS-A and PAS-B), with negative temperature ramping. The experiment was conducted with four separate fixed-volume hydrocarbon injection events which occurred as the temperature was negatively ramped from 25° C. to 0° C. over a 1.7 hour period (from 2000 seconds to 8000 seconds in the Figure). The line labeled 1 in FIG. 6 shows the response of PAS-A, whereas the line labeled 2 shows the response of PAS-B. The four upward bulges in these two lines are the responses to the four hydrocarbon injection events. The dashed line labeled 3 is time vs. temperature. As shown in FIG. 6, the PDMS/PS-based sensor (PAS-A) exhibited a relatively flat baseline in response to negative temperature ramping, whereas the pure PDMS-based sensor (PAS-B) exhibited a baseline with a significant negative slope (approximately 25% decrease in $dR/R_0$) as a function of the same negative temperature ramping. In this context, "baseline" is defined as the line drawn through the valleys between the aforementioned upward bulges. FIG. 6 clearly demonstrates the undesirable high cross-sensitivity to temperature exhibited by the pure PDMS-based PAS-B, and the highly-desirable negligible cross-sensitivity to temperature exhibited by the new PDMS/PS-based PAS-A. From FIG. 6 it can also be seen that PAS-A more quickly returns to its baseline resistance following each hydrocarbon injection event, thereby exhibiting improved reversibility as compared to PAS-B.

What is claimed is:

1. A polymer absorption sensor ("PAS"), comprising:
    a substrate having an electrically non-conductive, non-absorbent surface;
    a polymer matrix film on the substrate, wherein the polymer matrix film is comprised of:
        at least one first polymeric material which is cross-linked and elastomeric in nature,
        at least one second polymeric material, which is crystalline and/or glassy in nature, being selected from the group consisting of polyethylene, polypropylene, polyurethane, polystyrene, poly (methyl methacrylate), vinyl halides, polyesters, acrylics and mixtures thereof;
    wherein a cross-sensitivity of the at least one first polymeric material to temperature and water is mitigated by integration of the at least one second polymetric material into the polymer matrix film;
    wherein a Hansen solubility parameter of the polymer matrix film is such that the polymer matrix film is miscible to and thereby sensitive to exposure to one or more selected analytes composed of liquids, vapors, or gases;
        and at least one conductive material embedded in the polymer matrix film; and
    two electrical connections that provide an electrical connection to the polymer matrix film.

2. The PAS of claim 1, wherein the first polymeric material is a siloxane.

3. The PAS of claim 2, wherein the first polymeric material is poly(dimethylsiloxane).

4. The PAS of claim 1, wherein the second polymeric material is polystyrene.

5. The PAS of claim 4, wherein the conductive materials are selected from the group consisting of metallic particles, carbon-based particles, conductive polymers and mixtures thereof.

6. The PAS of claim 5, wherein the conductive particles are selected from the group consisting of metallic materials.

7. The PAS of claim 5, wherein the conductive particles are selected from the group consisting of carbon-based materials.

8. The PAS of claim 7, wherein the conductive particles are carbon black.

9. The PAS of claim 1 wherein said one or more selected analytes comprise volatile organic compounds (VOCs).

10. The PAS of claim 1, wherein the first polymeric material and the second polymeric material are combined in a ratio of about 5:1.

* * * * *